Oct. 20, 1936.  E. G. HILL, JR  2,058,313
CLUTCH OPERATING DEVICE FOR MOTOR VEHICLES
Filed Sept. 8, 1930  2 Sheets-Sheet 1
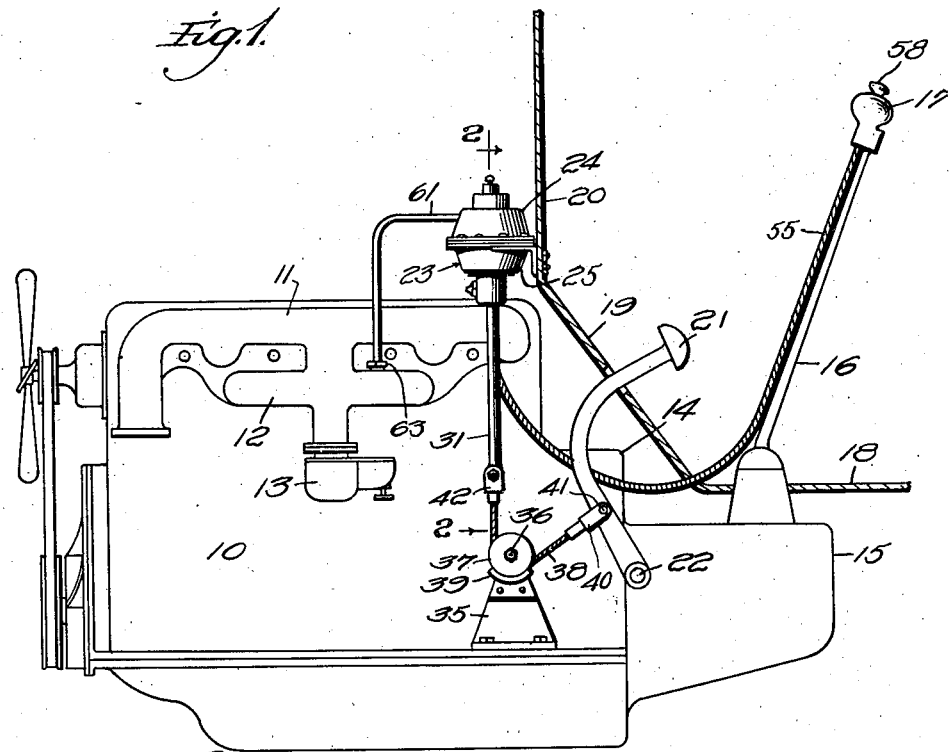
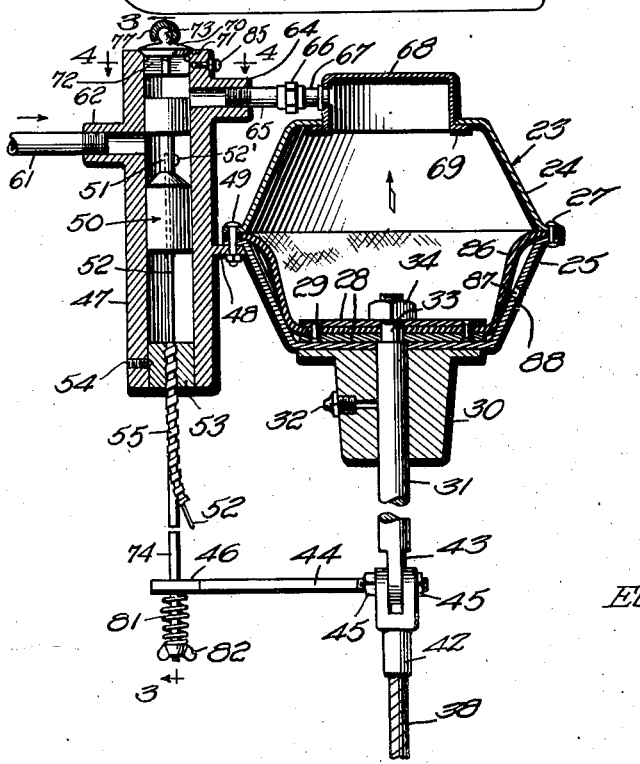
Inventor
EDWARD G. HILL
C. L. Parker Jr.
Attorney

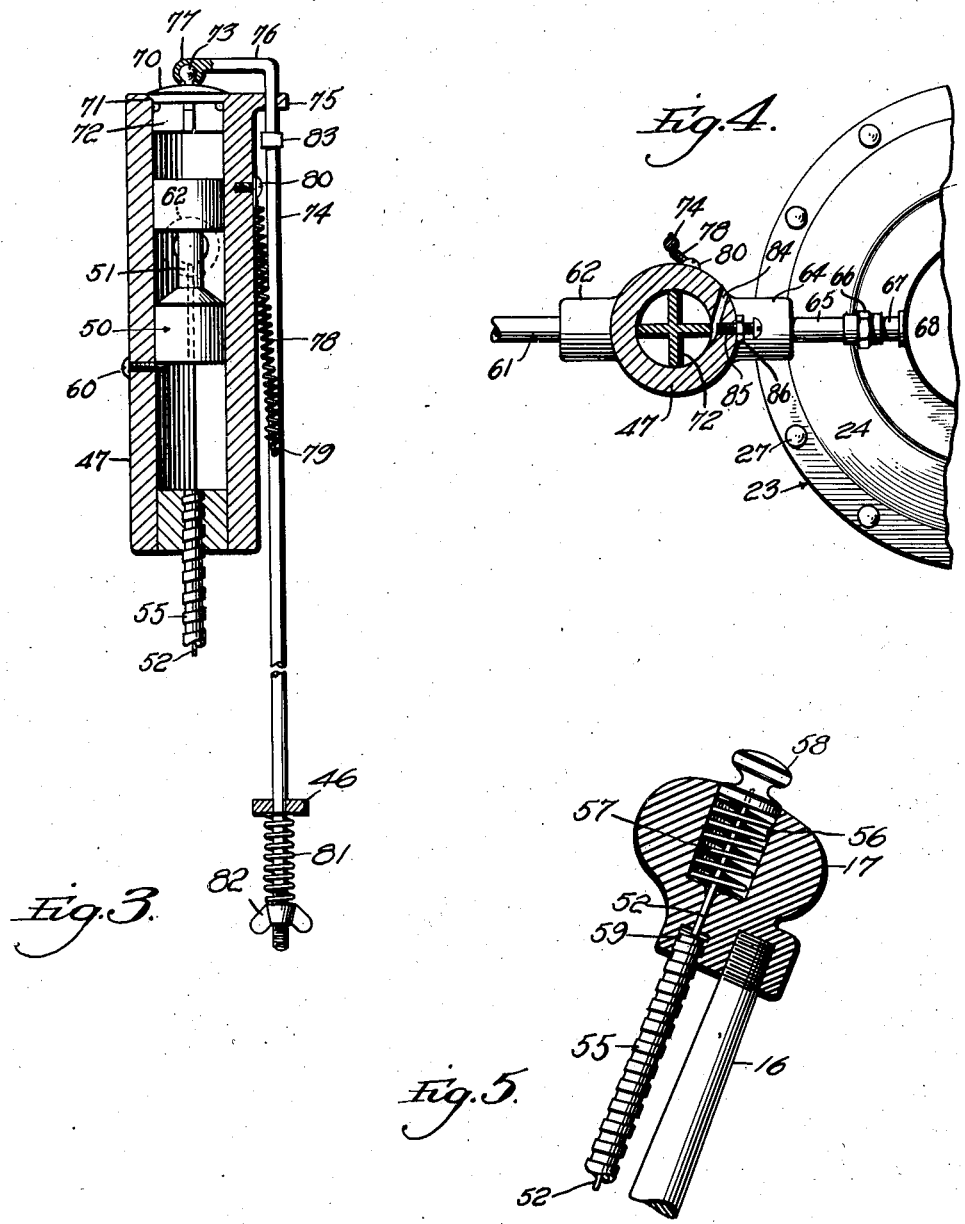

Patented Oct. 20, 1936

2,058,313

UNITED STATES PATENT OFFICE 2,058,313

CLUTCH OPERATING DEVICE FOR MOTOR VEHICLES

Edward G. Hill, Jr., Richmond, Va., assignor to Hill Engineering Corporation, Richmond, Va., a corporation of Virginia Application September 8, 1930, Serial No. 480,598

4 Claims. (Cl. 192—91)

This invention relates to clutch operating devices for motor vehicles.

In my copending applications Serial No. 364,246, filed May 18th, 1929, and Serial No. 431,001, filed February 24th, 1930, I have disclosed differential pressure mechanisms adapted for operating the clutch and brake mechanisms of a motor vehicle. It has been found, however, that there is considerable demand for a simple form of differential pressure operated device for actuating the clutch pedal only of a motor vehicle, and the present invention therefore is an improvement in a sense over the structures shown in my copending applications for actuating motor vehicle clutch pedals.

An important object of the present invention is to provide a simple and efficient device which readily may be installed on a motor vehicle for operating the clutch pedal thereof.

A further object is to provide a novel device operated by differential pressure for moving the clutch pedal of a motor vehicle to depressed or inoperative position, and for automatically controlling the return movement of the clutch pedal to operative position.

A further object is to provide a device of the character referred to which is controlled from the gear shift lever of the vehicle for causing the clutch pedal to be depressed, and which is automatically operable upon release of the control device for retarding the movement of the clutch elements to normal position at the point where such elements are about to become engaged so as to prevent the "grabbing" of the clutch.

A further object is to provide a device of the character referred to wherein the point at which the return movement of the clutch pedal is retarded may be varied according to each individual installation, and to provide means for regulating the rate of movement of the parts to govern the retarded movement of the clutch elements as they become engaged whereby a smooth clutch engaging action is accomplished.

A further object is to provide a device of the character referred to which is adapted to utilize the suction of the intake manifold of the engine as the source of differential pressure, and wherein a simple differential pressure power device is employed together with novel control valve means therefor.

Other objects and advantages of the invention will become apparent during the course of the following description.

In the drawings I have shown one embodiment of the invention. In this showing,

Figure 1 is a side elevation of a motor vehicle engine and associated elements showing the invention applied, Figure 2 is an enlarged section on line 2—2 of Figure 1, Figure 3 is a vertical section on line 3—3 of Figure 2, Figure 4 is a detail section on line 4—4 of Figure 2, and Figure 5 is a detail section of the gear shift lever knob and associated elements.

Referring to Figure 1 the numeral 10 designates a motor vehicle engine having the usual exhaust manifold 11 and intake manifold 12, the latter being supplied with a combustible mixture by a carbureter 13. A clutch housing 14 is arranged rearwardly of the engine and connects the latter to the elements of a gear set 15. The usual gear shift lever 16 is provided and has a gear shift knob 17 at its upper end to be referred to in detail later.

The gear shift lever and associated elements project upwardly through the floor 18 of the vehicle, the forward portion of which slopes upwardly as at 19 and connects to a dash 20. The usual clutch pedal 21 operates through a slot in the sloping floor boards 19 and is connected to a clutch control shaft 22. The elements of the device so far described form no part of the present invention and constitute standard practice in automobile manufacture.

The numeral 23 designates a diaphragm housing as a whole comprising complementary frustroconical sections 24 and 25 having the edge portions of a diaphragm 26 arranged therebetween. The edges of the housing sections 24 and the edge portion of the diaphragm 26 are secured together by rivets 27 or any other suitable fastening means. The central portion of the diaphragm is provided with plates 28 secured against the diaphragm by rivets 29.

A bearing member 30 is secured in any suitable manner against the bottom of the casing section 25 and slidably receives an operating rod 31. A pressure lubricating fitting 32 is preferably provided for the bearing 30. The upper end of the rod 31 may be reduced as at 33 to extend through the plates 28 and diaphragm 26, and a nut 34 is threaded on the upper reduced extremity of the rod. It will be apparent that differential pressure on opposite sides of the diaphragm 26 is adapted to transmit vertical movement to the rod 31.

A supporting bracket 35 is mounted on any suitable part of the vehicle and supports a shaft 36.

This shaft in turn rotatably supports a pulley 37 grooved to receive a cable 38. A guard 39 is preferably provided to prevent the cable from becoming displaced from the groove of the pulley 37. A yoke 40 is carried by one end of the cable and is pivotally connected as at 41 to the clutch pedal 21. A yoke 42 is connected to the opposite end of the cable, as shown in Figures 1 and 2. This yoke receives the reduced lower end 43 of the rod 31. An arm 44 passes through the arms of the yoke 42 and the end 43 and is threaded in nuts 45 arranged against the arms of the yoke. The arm 44 projects laterally a substantial distance and is provided in its free end with an eye 46 for a purpose to be described.

A valve casing 47 is mounted adjacent the diaphragm casing 23, and is preferably rigidly secured thereto prior to the installation of the device in a motor vehicle. In this way, installation costs are held at a minimum since most of the assembling of the device is done at the factory. In the present instance, the valve casing has been shown as being provided with a projecting lug 48. One of the rivets 27 is omitted from the diaphragm casing and a bolt 49 is substituted therefor and passes through the lug 48 to support the valve casing.

A valve 50 is slidable in the casing 47 and is provided intermediate its ends with a reduced portion 51. Reciprocation of the valve is accomplished by movement of a flexible wire 52 which extends through a suitable opening drilled axially through the bottom of the valve 50, and the wire may be secured to the valve by a set screw 52'. A plug 53 is arranged in the bottom of the valve casing and is secured thereto by a set screw 54. A flexible housing 55 projects through the plug 53, as shown in Figure 2, and the wire 52 is slidable in the housing 55.

The gear shift knob 17 is offset with respect to the gear shift lever, as clearly shown in Figure 5. The top of the gear shift knob is provided with a recess 56 in which is arranged a compression spring 57. A push button 58 is slidable in the recess 56 and is normally urged upwardly by the spring 57. The housing 55 projects into a recess 59, formed in the bottom of the knob 17, and the flexible wire 52 projects upwardly through the knob for connection with the button 58.

The valve 50 is slidable upwardly upon depression of the button 58, and when the button is released, the spring 57 returns the button and valve to their normal positions. A set screw 60 may be provided for limiting the downward movement of the valve, as shown in Figure 3. The valve thus is in normal communication with a pipe 61 threaded in a boss 62 formed integral with the valve casing 47. The other end of the pipe 61 is connected to a fitting 63 tapped into the intake manifold 12.

The valve casing is provided at its upper end with a boss 64 in which is mounted a short pipe section 65. This pipe section is connected by a union 66 to a similar pipe section 67 threaded into a dome 68, as shown in Figure 2. This dome may be provided with a lower peripheral flange 69 welded or otherwise secured against the top wall of the diaphragm casing section 24.

A vent valve 70 engages a valve seat 71 formed in the upper end of the casing 47. The valve is vertically movable and is provided with depending guides 72 slidable against the inner surface of the valve casing. A ball 73 is carried by the top of the valve 70.

A rod 74 is arranged parallel to the valve casing and is slidable in a guide 75 preferably formed integral therewith. The upper end of the rod 74 extends across the top of the valve casing as at 76 and is provided with a socket 77 receiving the ball 73. One end of a light tension spring 78 is secured at its lower end as at 79 to the rod 74 and at its upper end as at 80 to the valve casing 47. The lower end of the rod 74 extends through the eye 46, as shown in Figure 3. A compression spring 81 has its upper end normally in engagement with the eye 46 and its lower end in engagement with a wing nut 82. A collar 83 may be mounted on the rod 74 to limit its upward movement under conditions to be referred to.

Referring to Figure 4 it will be noted that the valve casing is provided with a vent opening 84, the effective area of which is determined by the position of an adjusting screw 85. This screw is provided with a lock nut 86 to permit it to be secured in adjusted position.

It is necessary of course, to vent the bottom diaphragm casing 25 to the atmosphere when the space above the diaphragm is connected to the intake manifold. The venting of the space beneath the diaphragm may be accomplished in any desired manner, and in the present instance, the lower diaphragm casing is shown as being provided with an opening 87 having a fine mesh screen 88 arranged over the vent opening to prevent foreign material from entering the lower casing.

The operation of the device is as follows:

The shifting of the gears may be accomplished without manually depressing the clutch pedal 21. When it is desired to shift gears, the operator will grasp the knob 17 and depress the button 58. Movement of the button will be transmitted to the valve 50 through the flexible wire 52, and thus the space around the cut-out portion 51 of the valve will establish communication between the pipes 61 and 65.

Under such conditions, the space above the diaphragm 26 will communicate with the intake manifold, thus establishing a pressure differential on opposite sides of the diaphragm to cause the latter to move upwardly. This upward movement is transmitted to the rod 31, thus exerting a pull on the cable 38 and pulling the clutch pedal to depressed position to disengage the clutch. The operator then may shift gears through movement of the knob 17, and release the button 58 to permit it to return to normal position. Assuming that the operator has started in first gear, the accelerator pedal will be depressed upon the release of the button 58 in accordance with standard practice.

Upward movement of the rod 31 in the manner previously described obviously causes the arm 44 and eye 46 to be moved upwardly, thus releasing the rod 74 from the tension of the compression spring 81. The tension spring 78 thereupon moves the rod 74 upwardly to unseat the valve 70 and afford communication between the atmosphere and the upper end of the chamber 47. The spring 78 holds the valve 70 in open position as long as the clutch pedal is depressed, and the button 58 is depressed against the tension of the spring 57 in the gear shift lever knob. The valve 50, however, will be in operative position at this time and the upper end of the valve will cut off communication between the pipe 65 and the atmosphere.

As soon as the button 58 is released, the spring 57 of the gear shift knob will return the button and the valve 50 to the normal position shown in Figures 2 and 3. At this time, communication will be afforded between the top of the diaphragm casing and the atmosphere through the pipes 65 and 67, and past the valve 70. Thus equalization of pressure will be rapidly established in the diaphragm chamber, and the diaphragm will move downwardly to permit the clutch pedal to return toward normal position.

As is well known, the clutch pedal of a motor vehicle has a range of movement considerably beyond that necessary to disengage the clutch, and accordingly a considerable portion of the return movement of the clutch pedal merely brings the clutch elements to a point where they are ready to come into engagement with each other. When the clutch elements approach the point of engagement with each other the eye 46 of the arm 44 will engage the spring 81, thus moving the rod 74 downwardly against the tension of the lighter spring 78, and the valve 70 will be seated.

The rapid movement of the clutch pedal back to normal position thus will be checked just prior to the point of engagement of the clutch elements, and the bleed opening 84 permits a relatively slow movement of air into the upper end of the valve casing 47, and consequently into the top of the diaphragm casing to permit relatively slow movement of the parts to normal position. Obviously, therefore, the clutch elements will be brought into engagement with each other slowly in accordance with standard practice of the manual control of the clutch pedal, and thus "grabbing" of the clutch will be prevented. As soon as the vehicle has picked up sufficient momentum in first gear, the operation is repeated for intermediate and high gears, the clutch mechanism operating in the manner desired in each instance.

Different vehicles vary as to the exact point of engagement of the clutch elements with relation to the travel of the clutch pedal and the proper checking of the movement of the clutch pedal to return position may be secured by adjusting the wing nut 82 to determine the point in the return movement of the rod 31 at which the arm 44 will effect the closing of the valve 70. The rate of movement of the clutch pedal to normal position after the checking action has taken place readily may be governed by adjustment of the screw 85. For example, if it is found that the elements of the clutch are brought together too slowly, the screw 85 may be backed out to increase the effective cross-sectional area of the bleed port 84. Conversely, the effective area of the port 84 may be decreased by turning the screw 85 inwardly if it is found that the clutch engagement takes place too rapidly.

Accordingly it will be apparent that accurate adjustment readily may be made to permit the checking action to take place at any desired point and to bring the clutch elements into engagement in the proper manner. The rapid movement of the parts as they start toward their normal positions greatly minimizes the time required for operating the clutch, and thus permits the shifting of the gears to take place easily and rapidly. It will be noted in this connection that the partial vacuum in the intake manifold is always communicated to the space surrounding the cut out portion 51 of the valve, and thus is in a position to be immediately communicated to the upper chamber of the diaphragm mechanism as soon as the button 58 is depressed. Thus it will be apparent that the gears may be shifted immediately upon the depression of the button 58.

The mounting of the valve mechanism on the diaphragm casing minimizes the work required for the assembling of the device. When the device is to be mounted on a vehicle, it merely is necessary to support the diaphragm casing by means of a suitable bracket secured to the dash, as shown in Figure 1, to support the bearing 35, tap the intake manifold to receive the fitting 63, and drill the clutch pedal for reception of the pivot pin 41. Thus it will be apparent that the cost of installing the device will be very small.

Where the expression "normal position", or some similar expression, is employed in the claims, it is understood that this expression has reference to the position to which the part referred to will move in the absence of any especially applied force moving or holding the part away from such position.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a power device including a chamber having a member therein operative by differential pressure on opposite sides thereof, means connecting said member to a motor vehicle clutch having a normal bias to operative position, a valve housing having a pair of ports one communicating with one end of said chamber and the other with a source of differential pressure, a valve mounted in said housing and normally occupying one position to disconnect said ports from each other, said valve being movable to a second position to establish communication between said ports, said housing having an open end adapted to communicate with the atmosphere and normally in communication with the port leading to said end of said chamber, an auxiliary valve adapted to seat against the open end of said valve housing, said valve housing being provided with a bleed port affording limited communication between said last mentioned port and the atmosphere independently of said auxiliary valve, means operative for opening said auxiliary valve when the clutch elements are disengaged by said power device, and spring means constantly urging said auxiliary valve toward closed position.

2. Apparatus constructed in accordance with claim 1 wherein the means operative for opening said auxiliary valve comprises a slidable rod connected to said auxiliary valve and a spring connected to said rod, and an arm carried by said connecting means, said spring means being arranged between said arm and said rod.

3. Apparatus constructed in accordance with claim 1 provided with an adjusting member carried by said valve housing and operative for varying the effective area of said bleed port.

4. The combination with a motor vehicle clutch having a normal bias to operative position, and an operating pedal therefor, of a power device including a chamber having a member therein operative by differential pressure on opposite sides thereof, means connecting said member to the clutch pedal, a valve housing having a pair of ports one communicating with one end of said chamber and the other with a source of differential pressure, a valve mounted in said housing and normally occupying one position to disconnect said ports from each other, said valve being movable to a second position to establish communication between said ports, said housing having an open end adapted to communicate with the atmosphere and normally in communication with the port leading to said end of said chamber, an auxiliary valve adapted to seat against the open end of said valve housing, said valve housing being provided with a bleed port affording limited communication between said last mentioned port and the atmosphere independently of said auxiliary valve, means rendered operative for opening said auxiliary valve when the clutch elements are disengaged by said power device, said last named means being rendered inoperative as said clutch elements approach operative position, and spring means constantly urging said auxiliary valve toward closed position.

EDWARD G. HILL, Jr.